United States Patent [19]
Featherstone

[11] 3,724,488
[45] Apr. 3, 1973

[54] COMBINATION SEAL CAP AND VALVE

[76] Inventor: Arthur H. Featherstone, 2895 Scenic View Road, Alpine, Calif. 92001

[22] Filed: Oct. 1, 1971

[21] Appl. No.: 185,755

[52] U.S. Cl. ............ 137/223, 137/614.17, 137/232, 138/89
[51] Int. Cl. ............................................. F16k 15/20
[58] Field of Search......... 137/223, 231, 232, 614.17; 152/428, DIG. 11; 138/89, 89.1, 89.2, 89.3; 73/146.8

[56] References Cited

UNITED STATES PATENTS

| 3,050,080 | 8/1962 | Pagano | 137/614.17 |
| 1,468,273 | 9/1923 | Borden | 137/223 |
| 629,561 | 7/1899 | Harrison | 137/614.17 X |
| 1,045,937 | 12/1912 | Borden | 137/614.17 X |
| 1,525,150 | 2/1925 | Reynolds | 137/614.17 X |
| 1,478,584 | 12/1923 | Schweinert | 137/614.17 X |

Primary Examiner—Harold W. Weakley
Attorney—Richard K. MacNeill

[57] ABSTRACT

A combination seal cap and valve for use with a standard pneumatic tire stem valve having an outer sleeve internally threaded at one end for an internal threadable engagement with a standard valve stem and internally threaded at another end for threadably receiving a standard stem valve. A tapered plug member captured within the outer sleeve and dimensioned for sealing the standard valve stem when the outer sleeve is snugly mounted thereto and for allowing an air passage through said sleeve and said standard valve stem into a tire when backed off from a snug installation.

2 Claims, 3 Drawing Figures

PATENTED APR 3 1973  3,724,488

INVENTOR.
ARTHUR H. FEATHERSTONE
BY
*Richard K. Macneill*

COMBINATION SEAL CAP AND VALVE

BRIEF DESCRIPTION OF THE INVENTION

The present invention relates to a seal cap and valve combination and more particularly to a seal cap and valve combination in which removal of the cap is not necessary for air transfer.

According to the invention a seal cap and valve combination is provided having a sleeve internally threaded at one end thereof for engagement with the threads of a standard valve stem. The other end of the sleeve is also internally threaded and dimensioned for threadable engagement with a standard stem valve. A tapered plug is disposed within the sleeve and dimensioned for a snug sealing fit in the internal thread portion of the standard valve stem of a tire. In operation, when the sleeve is engaged in a snug fit against the standard valve stem a double seal will be effected, i.e., by the tapered plug and the valve stem. When the sleeve is backed off a few turns the tapered plug will become disengaged from the internal thread portion of the standard stem and air can be passed into or out of the stem valve by conventional means.

An object of the present invention is the provisions of a seal cap and valve combination for use with standard valve stems.

A further object of the invention is the provision of a seal cap and valve combination which effects a double seal when installed.

A still further object is to provide positive non-spring operated mechanical sealing to a valve stem without necessitating a total removal of the sealing cap.

Another object of the invention is the provision of a seal cap and valve combination which is inexpensive to manufacture and extremely convenient in use.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein.

DETAILED DESCRIPTION OF THE DRAWING

Figure 1:
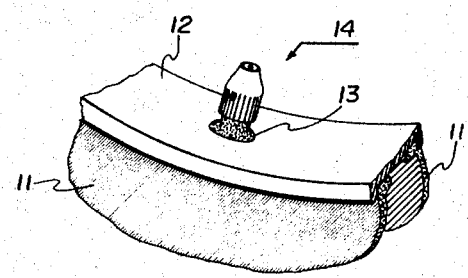
FIG. 1 is a schematic representation of a section of conventional tire and rim with the invention shown in situ.

Referring to FIG. 1, a section of a tire is shown at 11 mounted on a rim 12. A standard valve stem base is shown protruding therethrough with a seal cap and valve combination 14 of the present invention.

Figure 2:
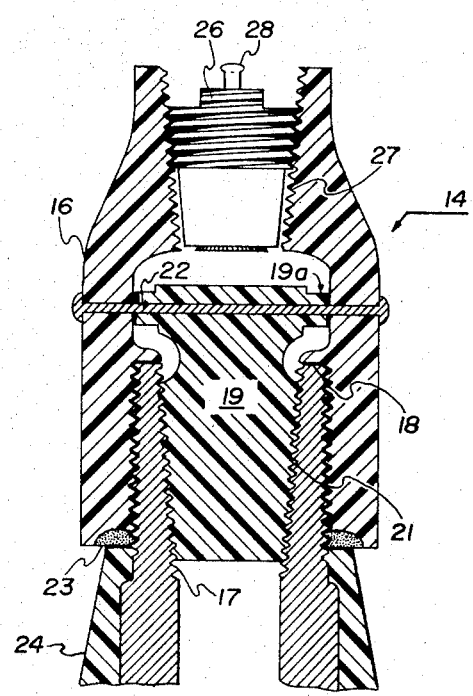
FIG. 2 is a sectioned side elevation of the preferred embodiment of the present invention in a sealed condition.

Referring to FIG. 2, the seal cap and valve combination of FIG. 1, shown generally at 14, has a sleeve portion 16 in threadable engagement at one end with valve stem 17 in abutting relationship at shoulder 18. Tapered plug 19 is in abutting relationship with internal thread portion 21 of valve stem 17. Retaining pin 22 retains plug 19 within sleeve 16. The terminating end 23 of sleeve 16 also forms a sealing surface with stem valve base 24. Standard stem valve 26 is threadably received by threaded bore 27 of sleeve 16. Boss projection 19A of plug 19 is dimensioned for holding pin 22 and does not continue around the periphery of plug 19 leaving an air channel between plug 19 and the inner surface of sleeve 16.

Figure 3:
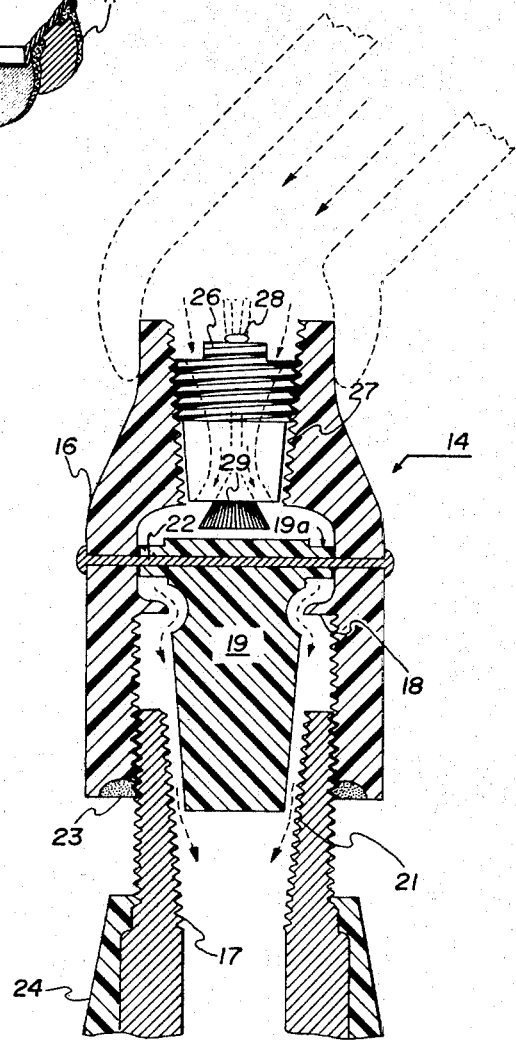
FIG. 3 is a sectioned side elevation of the embodiment of FIG. 2 in an unsealed position.

Referring to FIG. 3, the open position of the seal cap and valve combination 14 is shown where again, sleeve 16 carries tapered plug 19 by holding retaining pin 22 and is backed off on valve stem 17 until shoulders 23 and 18 no longer seal, and tapered plug 19 is no longer in abutting relationship with the internal thread portion 21 of valve stem 17. As shown, pin 28 of stem valve 26 is depressed unseating tapered seat 29 and allowing an air passage as shown by arrows through stem valve 26 and around tapered plug 19 into valve stem 17.

OPERATION

Referring back to all of the FIGS., it can be seen that a seal is effected by tapered plug 19 and the internal threaded portion 21 of valve stem 17 along with the standard stem valve 26 with internal thread portion 27 of sleeve 16. Sealing surfaces 18 and 23 prevent air from escaping through the sleeve portion itself when in the sealed position. Referring specifically to FIG. 3, when the sleeve 16 is backed off tapered plug 19 is carried with it removing the seal at the internal threaded portion 21 of valve stem 17 and allowing air to pass around plug 19 and through stem valve 26 when pin 28 is in the depressed position as shown on tapered seat 29.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:

1. A combination seal cap and valve for use with a standard pnuematic tire stem valve comprising:
    an outer sleeve internally threaded at one end of an internal threadable engagement with a standard valve stem and internally threaded at another end for an internal threadable engagement with standard stem valve; and
    a tapered plug member secured within said outer sleeve and dimensioned for sealing a standard valve stem when said outer sleeve is snugly mounted thereto and for allowing an air passage through said sleeve and said standard valve stem when said sleeve is backed off from a snug installation.

2. The combination seal cap and valve of claim 1 and further including:
    an internal annualar shoulder on an inside surface of said sleeve dimensioned for effecting a seal on the end of a standard valve stem.

* * * * *